United States Patent [19]

Terayama et al.

[11] Patent Number: 5,101,312
[45] Date of Patent: * Mar. 31, 1992

[54] GUIDE MECHANISM FOR OPTIMIZING THE POSITION OF A TAPE TAKE-OUT DEVICE IN A MAGNETIC TAPE LOADING AND UNLOADING APPARATUS

[75] Inventors: Takao Terayama, Ushiku; Hajime Yokota, Katsuta, both of Japan

[73] Assignee: Hitachi, Ltd., Tokyo, Japan

[ * ] Notice: The portion of the term of this patent subsequent to Sep. 12, 2006 has been disclaimed.

[21] Appl. No.: 697,497

[22] Filed: May 3, 1991

Related U.S. Application Data

[63] Continuation of Ser. No. 381,960, Jul. 19, 1989, abandoned, which is a continuation of Ser. No. 155,886, Feb. 16, 1988, Pat. No. 4,866,549.

[30] Foreign Application Priority Data

Feb. 25, 1987 [JP] Japan .................................. 62-42097

[51] Int. Cl.⁵ .......................................... G11B 15/665
[52] U.S. Cl. ....................................................... 360/85
[58] Field of Search ......................................... 360/85

[56] References Cited

U.S. PATENT DOCUMENTS 4,322,761  3/1982  Beitler et al. ......................... 360/85
4,866,549  9/1989  Terayama et al. .................... 360/85

Primary Examiner—Robert S. Tupper
Attorney, Agent, or Firm—Antonelli, Terry, Stout & Kraus

[57] ABSTRACT

A magnetic tape loading apparatus includes a magnetic tape take-out device slidingly movable on a base and tape take-out device control means of cam type provided on such a base, in order to maintain a predetermined positional relation between the magnetic tape and a rotational cylinder, when the magnetic tape contained within the cassette is taken out helically wound around the rotational cylinder or is stored into the cassette.

20 Claims, 3 Drawing Sheets

GUIDE MECHANISM FOR OPTIMIZING THE POSITION OF A TAPE TAKE-OUT DEVICE IN A MAGNETIC TAPE LOADING AND UNLOADING APPARATUS

This is a continuation of application Ser. No. 07/381,960 filed July 19, 1989, now abandoned, which is a continuation of Ser. No. 155,886 filed Feb. 16, 1988 now U.S. Pat. No. 4,866,549, issued Sept. 12, 1989.

BACKGROUND OF THE INVENTION

1. Field of the Invention

This invention relates to a magnetic tape loading apparatus and, more particularly, to a magnetic tape loading apparatus suitable for protecting the tape from being dislodged out of a tape guide and from being damaged in the process of taking the tape out of or placing it into a cassette.

2. Description of the Prior Art

A cassette type magnetic recording and reproducing device such as a video tape recorder is known as shown in U.S. Pat. No. 4,353,101 in which the tape, contained within the cassette, is taken into a predetermined location out of the cassette when the cassette is set in the video taperecorder prior to running operation of the tape at that location. In such a conventional video tape recorder, a rotational cylinder is inclined to register a signal on the tape and to reproduce the signal from the tape. In order to securely or accurately contact the tape with the inclined rotational cylinder, the position and inclination of the tape take-up device, after pulling the tape out of the cassette, are precisely calculated and controlled from the results of such calculation.

One example of a conventional tape take-out device is illustrated in FIGS. 8 and 9, wherein a tape guide 12 is provided at both upper and lower ends portions thereof with flanges 24A and 24B to restrict the upward or downward displacement of a tape 4. A second tape guide 11 is fixed on a common shifting base 25 together with a tape guide 12. The shifting base 25 is mounted on a guide member 28 securely fixed on a chassis 26 by screw fasteners 27A, 27B. Guide pins 29A, 29B are connected with the lower surface of the shift base 25, with the guide pins 29A, 29B being fitted in a central groove of the guide member 28. A spring member 30 is attached on the lower surface of the shifting base 25 by a screw 31 from an underside of the guide member 28 so that the shifting base 25 and the spring 30 hold the guide member 28 therebetween with suitable spring force. A link 32 is connected to the guide pin 29A, with the link 32 being connected to tape take-out device driving means (not shown), so as to move the shifting base 25 along the groove on the guide member 28. Also, the shifting base 25 slides with its lower sliding surfaces 33A, 33B contacting on the guide member 28, while the outer peripheral surfaces of the guide pins 29A, 29B slide along side surfaces 34A, 34B of the groove of the guide member 28.

However, a shifting passage of the above-mentioned conventional tape take-out device has been designed in such a manner that the tape take-out device is merely protected from interference with the remaining members during operations such as taking out or storing the tape. On the other hand, a shape of the upper surface of the guide member on which the tape take-out device slides is thus usually either formed parallel to the chassis surface or formed at a slight inclination with respect to the chassis surface. On the other hand, a rotational cylinder is slantedly mounted so that the tape take-out device will move along the guide member as previously formed transferring the tape forcibly to press this tape against the rotational cylinder, whereby this causes problems, such as partially damaging the tape because of excessive force locally exerted on the tape, and the tape is dislodged from the tape take-out device.

SUMMARY OF THE INVENTION

Accordingly, one object of the present invention is to solve these defects in a magnetic tape loading apparatus by optimizing a posture of the tape take-out device with respect to the tape in process of taking out or storing the tape, thereby preventing the tape from local application of excessive force, and to provide an improved magnetic tape loading apparatus.

A further object of the present invention is to realize tape loading by a simple reliable mechanism, which eliminates unfavorable influences on the tape in the processes of tape taking out and storing.

A magnetic tape loading apparatus according to the present invention comprises a rotational cylinder including heads a tape take-out device for taking the tape out of and putting it into the cassette, a guide member for guidance of the tape take-out device, and a drive means for moving the tape take-out device along the guide member, wherein the tape take-out device is moved upwardly or downwardly in the process of tape taking out and storing operations, and controlling means for inclined movement of the tape take-out device in fore-and-aft and left-and-right directions is provided on the guide member.

These and further objects of the present invention will become clearer with reference to the following detailed description of an illustrative embodiment of this invention.

DESCRIPTION OF THE PREFERRED EMBODIMENTS

Figure 1:
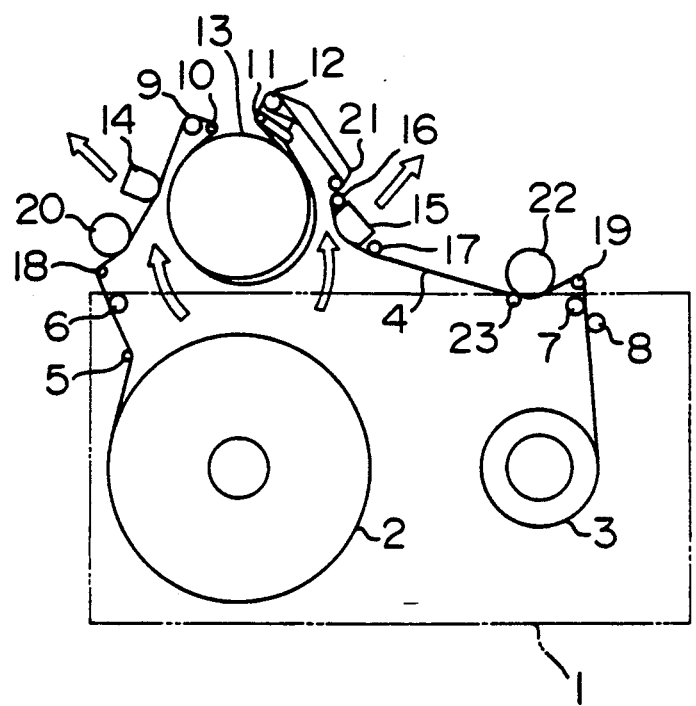
FIG. 1 is a plan view showing a cassette type magnetic recording and reproducing device after pulling the tape out of the cassette.

Referring now to the drawings wherein like reference numerals are used throughout the various views to designate like parts and, more particularly, to FIG. 1, according to this figure, reels 2, 3 are contained within a cassette 1 so that a tape 4, wound around the reel 2, is taken up around the reel 3 passing through a number of tape guides 5, 6, 7, 8 disposed in the cassette 1. Tape guides 9, 10, and 11, 12 for taking the tape out of the cassette are positioned initially within the cassette 1 (inside the casing of the cassette shown by a doubledashed chain line). These tape guides 9, 10 and 11, 12 move toward their respective positions shown in FIG. 1, passing in proximity to the opposite sides of a rotational cylinder 13 on which magnetic heads are mounted as the tape taking out operation progresses. An erasing head 14, a control head 15 and tape guide 16, 17 which interrupt the tape taking out operation are displaced toward the opposite sides of the rotational cylinder 13 in synchronism with the tape taking out operation. Also, tape guides 18, 19, 21 are initially located within the cassette 1 but they are transferred to the illustrated positions in synchronism with the tape taking out operation. A stationary tape guide 20 is provided at the illustrated position. A pinch roller 20 is moved in synchronism with the tape taking out operation so that it contacts a fixed-type capstan 23 to engage the tape against the capstan 23.

Figure 5:
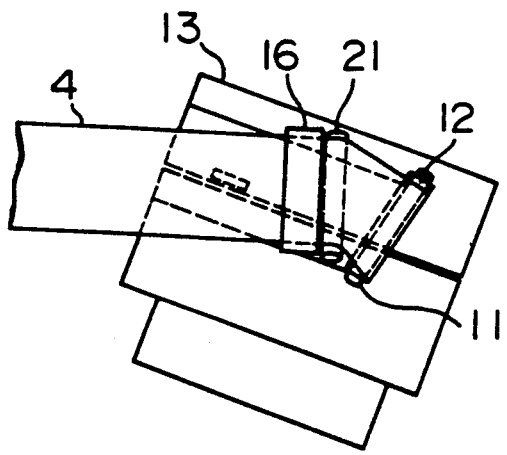
FIG. 5 is a side view showing the tape to be loaded by the tape take-out device of the present invention.
Figure 6:
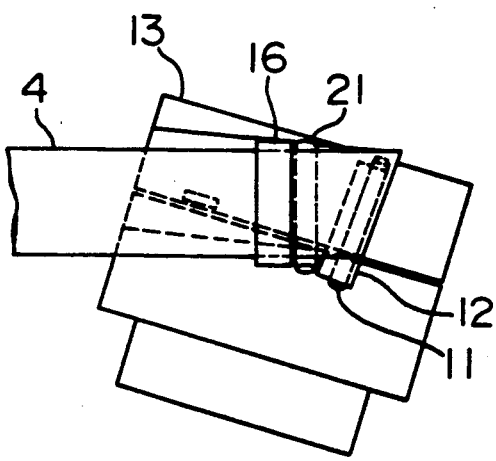
FIG. 6 is a side view showing the tape to be loaded by the conventional tape take-out device.
Figure 7:
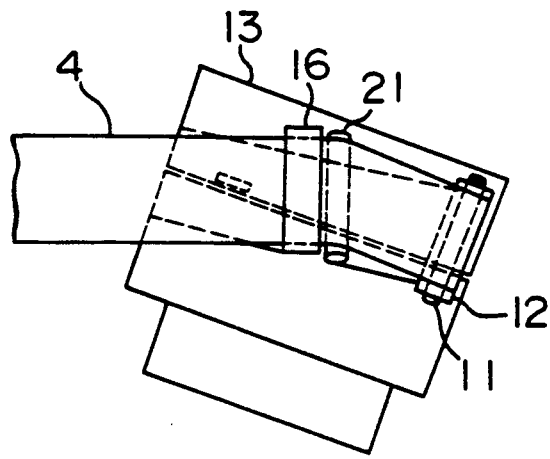
FIG. 7 is a side view showing the tape in running condition.
Figure 8:
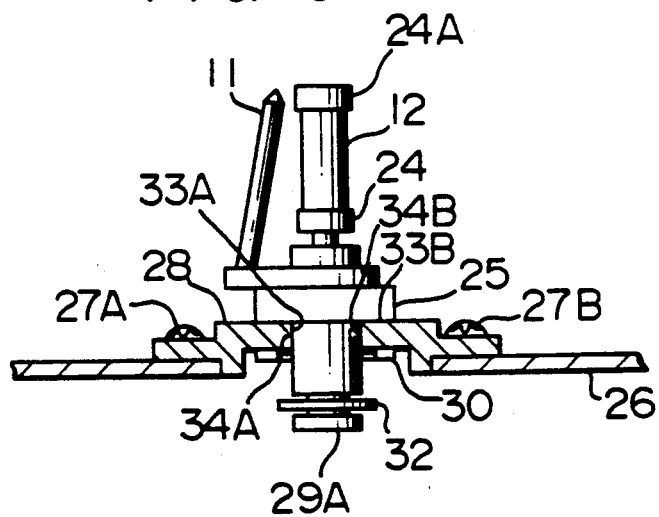
FIGS. 8 and 9 are front and side views of the conventional tape take-out device, respectively.
Figure 9:
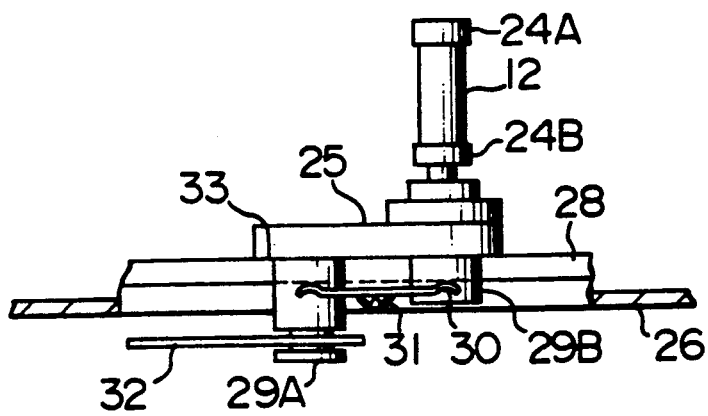

The rotational cylinder 13 is inclined with respect to the cassette 1. The tape 4 is helically contacted around this rotational cylinder 13 to record the signal on the tape or reproduce the signal from the tape. The tape 4, after completion of the recording or the reproduction, has an inclined posture when it leaves the rotational cylinder 13, so that the tape guides 11, 12 and 21 are also inclined with respect to the cassette 1 in order to turn the inclined tape toward the horizontal direction (FIG. 5).

Figure 2:
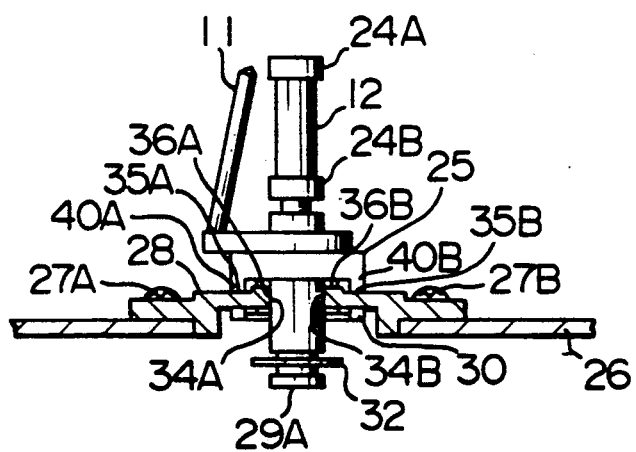
FIGS. 2 and 3 are front and side views of a tape take-out device according to one embodiment of the present invention, respectively.
Figure 3:
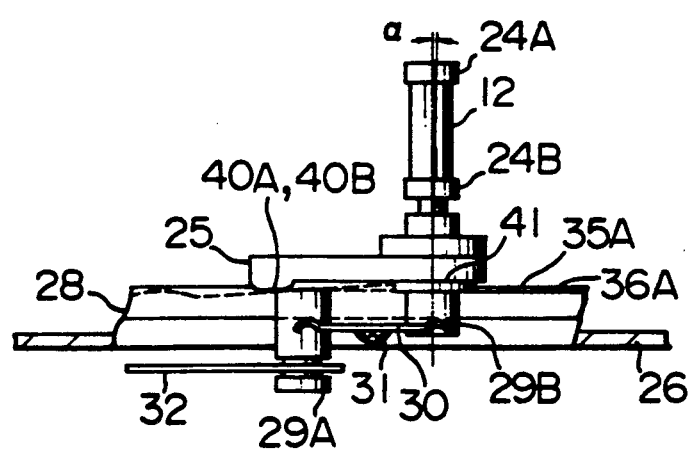
Figure 4:
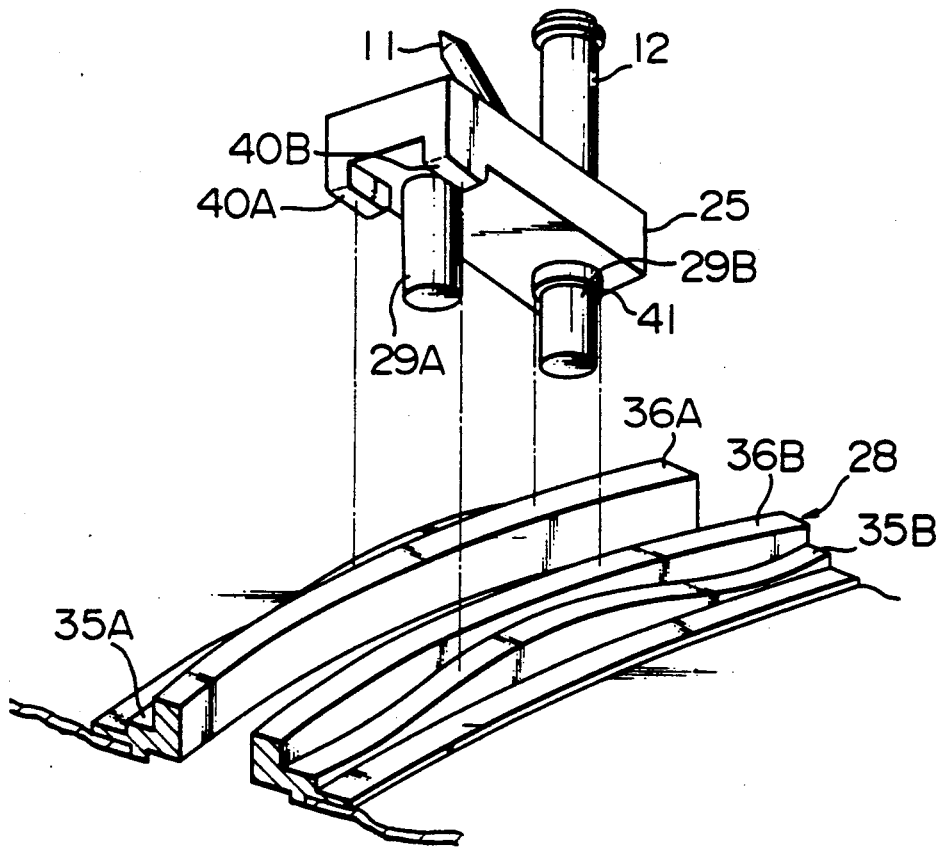
FIG. 4 is a perspective view of a tape take-out device in accordance with the present invention.

In the tape take-out device, as shown in FIGS. 2 and 4, tape guides 11, 12 are together fixed on a shifting base 25 mounted on a guide member 28. On the upper surface of the guide member 28, individual bearing surfaces 35A, 35B and 36A, 36B are provided on which the shifting base 25 can be slidingly moved. The bearing surfaces 35A, 35B are slidingly contacted with the slider portions 40A, 40B provided at both left and right ends of the lower surface of the shifting base 25, whereas, a slider portion 41, provided on a guide pin 29, may slidingly contact with the bearing surfaces 36A, 36B. In an arrangement of the guide member 28, if a height of each right bearing surface 35B, 36B is varied with respect to that of each left bearing surface 35A, 36B, the shifting base 25 is inclined leftward and rightward depending on the difference between the heights of the opposite bearing surfaces. Furthermore, if a height of each bearing surface 36A, 36B is altered with respect to that of each bearing surface 35A, 35B, the shifting base 25 is inclined forwardly and rearwardly depending on the difference between the heights of both bearing surfaces to cause the tape guides 11, 12 to tilt forwardly and rearwardly (with an angle α in FIG. 3).

Thus, the bearing surfaces 35A, 35B, 36A, 36B and the slider portions 40A, 40B, 41 may constitute tape take-out device controlling means.

When the cassette 1 is mounted on the video tape recorder and the tape guides 11, 12 convey the taken-out tape 4 to the rotational cylinder 13, the slider portions 40A, 40B of the shifting base 25 slide on the bearing surfaces 35A, 35B while the slider portion 41 slides on the bearing surfaces 36A, 36B, respectively. At that time, the shifting base 25 will be transferred upwardly and downwardly depending on the respective heights of the bearing surfaces 35A, 35B, 36A, 36B as well as inclined leftwardly, rightwardly, forwardly and rearwardly. The tape guides 11 and 12 thus behave similar to the movement of the shifting base. In this case, a direction of inclination and tilt angle positions for the tape guides 11 and 12 are previously precisely predetermined by the calculation so as to optimize the tape turning condition free from subjecting the tape 4 to an excessive local force. The tape can thus be protected from such unreasonable force without incurrance of the tape damage. The functions obtained during the tape taking out operations will be accomplished in the same way upon a storing of the tape.

In the conventional tape take-out device, since the unfavorable excessive force is locally exerted on the tape passing through the rotational cylinder 13, the tape will tend to dislodge from the tape guides 11, 12. When this condition of the tape becomes worse, the tape 4 deviates from the tape guides 11, 12 and, therefore, it is almost impossible to continuously take-out or store the tape.

The conditions for running the tape according to the present invention are substantially the same as the conventional one. The tape 4, after passing through the rotational cylinder 13, runs downwardly before turning and passing through the tape guides 21, 16. Finally the tape runs substantially parallel to the cassette 1, and it is then retrieved around the reel 3.

In the above-described embodiment, a cross-sectional shape of the bearing surfaces 36A, 36B of the guide member 28 may be formed as a common circular groove, which, in turn, receives the slider portion 41 of the guide pin 29B. The slider portion 41 in this case may be spherical and correspond to the concavity of the circular groove.

Furthermore, the same effects will be obtained even when a cross-sectional shape for the bearing surfaces 36A, 36B of the guide member 28 is formed as an inversely extending concaved circular arc, and the slider portion 41 of the guide pin 29B may be formed spherical to contact with this inverted groove of a common circle.

As has been described above, it is possible due to the present invention to transfer the tape in a three-dimensional optimum attitude through the tape take-out member during the process of tape taking out or tape storing without damaging the tape or dislodging it from the tape guides.

What is claimed is:

1. A magnetic tape loading apparatus comprising a rotational cylinder, tape-guide means for loading a tape taken out of a cassette against said rotational cylinder helically thereof and for guiding the tape back into the cassette, movable shifting base means for supporting said tape guide means, guide means having guide surfaces defining a path on which said shifting base means move, driving means for moving said shifting base means along said guide surfaces, and control means for adjusting an inclination of said tape guide means backwardly and forwardly in a direction of movement of said shifting base means during movement thereof, wherein said guide surfaces vary in height along said path, said guide surfaces being contacted by surfaces on a bottom of said shifting base means.

2. A magnetic tape loading apparatus comprising a rotational cylinder including a magnetic head, take-out means for taking a tape out of and returning a tape into a cassette and for guiding the tape to helically engage the tape along a circumference of said cylinder, guide surfaces defining a path on which said tape take-out means moves, drive means for moving said tape take-out means along said guide surfaces, and control means for moving said tape take-out means upwardly and/or downwardly relative to a surface on which the cassette is disposed and for inclining the tape take-up means backwardly and forwardly in a longitudinal direction of said path during the tape loading operations.

3. A magnetic tape loading apparatus comprising a rotatably mounted cylinder, said cylinder including a magnetic head, tape take-out means for taking a tape out of a cassette and guiding the tape into helical engagement with a circumference of said cylinder and then guiding the tape back into the cassette, guide surfaces defining a path on which said tape take-out means moves, drive means for moving said tape take-out means along said guide surfaces, and control means for moving said tape take-out means upwardly and/or downwardly relative to a surface on which the cassette is disposed and for inclining said tape take-out means backwardly and/or forwardly in a longitudinal direction of said path during the tape taking-out operation, wherein said tape take-out means includes a bottom, first and second slider portions provided leftwardly and rightwardly of said bottom of said tape take-out means and a third slider portion on a center axis of said bottom of said tape take-out means, and wherein said control means includes leftward and rightward bearing surfaces on which said first and second slider portions slide, the leftward and rightward bearing surfaces being disposed on the opposite sides of said path and varying in height along a longitudinal direction thereof.

4. A magnetic tape loading apparatus according to claim 3, wherein said third slider portion is provided with a spherical surface on the center axis of the bottom of said tape take-out means, and a widthwise cross-sectional shape of said guide surfaces on which said spherical surface slides is formed in a concave circular arc of a constant diameter.

5. A magnetic tape loading apparatus according to claim 3, wherein said third slider portion is provided with a spherical surface and a widthwise cross-sectional shape in an upper part of said guide surfaces opposed to said third slider portion is V-shaped.

6. A magnetic tape loading apparatus comprising a rotational cylinder rotatably mounted at a surface on which a cassette is disposed and including a magnetic head, tape take-out means for taking a tape out of and returning the tape into the cassette and for guiding the tape into helical engagement with a circumference of said cylinder, guide surfaces defining a path on which said tape take-out means moves, first tape take-out control means for moving said tape take-out means along said path, and second tape take-out control means for inclining said tape take-out means backwardly and forwardly in a longitudinal direction of said path while said tape take-out means is moved on said path and inclining said tape take-out means right and/or left of a longitudinal direction of said path during the tape-taking-out operation.

7. A magnetic tape loading apparatus comprising a rotatably mounted cylinder, tape take-out means for taking a tape out of a cassette and guiding the tape into helical engagement with a circumference of said cylinder and then back into the cassette, guide surfaces defining a path on which said tape take-out means moves, first tape take-out control means for moving said tape take-out means along said path, and second tape take-out control means for inclining said tape take-out means backwardly and/or forwardly in a direction of said path while said tape take-out means is moved along said path and for inclining said tape take-out means right and/or left of a direction of said path during a tape taking-out operation, wherein said tape take-out means includes a bottom, first and second slider portions provided leftwardly and rightwardly of said bottom of said tape take-out means and a third slider portion on a center axis of the bottom of said tape take-out means, and wherein said second tape take-out control means include leftward and rightward bearing surfaces on which said first and second slider portion slide, the leftward and rightward bearing surfaces varying in height along a longitudinal direction thereof.

8. A magnetic tape loading apparatus according to claim 7, wherein said third slider portion is provided with a spherical surface on the center axis of the bottom of said tape take-out means, and wherein a widthwise cross-sectional shape of the guide surfaces on which the spherical surface slides is formed in a concave circular arc of a constant diameter.

9. A magnetic tape loading apparatus according to claim 7, wherein said third slider portion is provided with a spherical surface on the center axis of the bottom of said tape take-out means, and wherein a widthwise cross-sectional shape in an upper part of the guide surfaces opposed to said third slider portion is V-shaped.

10. A magnetic tape loading apparatus comprising a rotational cylinder including a magnetic head, tape take-out means for taking a tape out of and returning the tape into a cassette, means for providing guide surfaces defining a path on which said tape take-out means are moved, drive means for moving said tape take-out means along said guide surfaces, and control means for moving said tape take-out means upwardly and downwardly with respect to the cassette and for varying the inclination of the tape take-out means backwardly and forwardly in the direction of movement thereof along said path in tape-taking-out and tape-storing operations.

11. A magnetic tape loading apparatus comprising a rotational cylinder including a magnetic head, tape take-out means for taking a tape out of and returning a tape into a cassette and loading the tape onto the rotational cylinder, guide means for defining a path on which said tape take-out means moves, and drive means for moving said tape take-out means along said guide means, said guide means including tape take-out control means for moving said tape take-out means upwardly and/or downwardly with respect to the cassette and for inclining said tape take-out means backwardly and/or forwardly in the direction of said path during tape loading operations, wherein said tape take-out means include a bottom, first and second slider portions provided leftwardly and rightwardly of said bottom of said tape take-out means and a third slider portion on a center axis of the bottom of said tape take-out means, and said tape-take-out control means include leftward and rightward bearing surfaces on which said first and second slider portions slide, the leftward and rightward bearing surfaces varying in height along a longitudinal direction thereof.

12. A magnetic tape loading apparatus according to claim 11, wherein said third slider portion is provided with a spherical surface on the center axis of said bottom of said tape take-out means, and wherein said guide means further include a guide surface on which the spherical surface slides, said guide surface being of a concave circular arc of a constant diameter, as viewed in cross-section.

13. A magnetic tape loading apparatus according to claim 11, wherein said third slider portion is provided with a spherical surface on a center axis of said bottom of said tape take-out means, said guide means further include guide surfaces, and wherein a widthwise cross-sectional shape of the guide surfaces opposed to said third slider portion is kept V-shaped.

14. A magnetic tape loading apparatus comprising a rotational cylinder including a magnetic head, tape take-out means for taking a tape out of and returning the tape into a cassette and loading the tape onto said rotational cylinder, guide means for defining a path on which said tape take-out means moves during a tape loading operation, drive means for moving said tape take-out means along said guide means, control means for moving said tape take-out means upwardly and/or downwardly with respect to the cassette and for inclining said tape take-out means for and/or -aft and right- or-left with respect to the path of movement of said tape take-out means during tape-taking-out and tape-storing operations.

15. A magnetic tape loading apparatus comprising a rotational cylinder, tape take-out means for taking a tape out of a cassette and helically engaging the tape taken out from the cassette around the rotational cylinder and for guiding the tape back into the cassette, guide means for defining a path on which said tape take-out means moves back and forth so as to engage the tape on a circumference of said rotational cylinder and guide the tape back into the cassette, said guide means having spaced upper surfaces and said tape take-out means having a plurality of slider portions provided on bottom surfaces thereof which are slid on said spaced upper surfaces of said guide means, said upper surfaces including curved surfaces for changing the degree of inclination of said tape take-out means in the direction of movement of said tape take-out means during tape taking-out and guiding operations.

16. A magnetic tape loading apparatus comprising a rotably mounted cylinder, tape take-out means for taking a tape out of and returning a tape into a cassette and for helically engaging the tape on said cylinder, guide means for defining a path on which said tape take-out means moves, drive means for moving the tape take-out means along the guide means, and tape take-out control means for inclining said tape take-out means backwardly and/or forwardly in a longitudinal direction of said path while said tape take-out means moves along said path for reducing damage to the tape during a tape take-out operation, said tape take-out control means being mounted on said guide means.

17. A magnetic tape loading apparatus comprising a rotational cylinder, tape take-out means for taking a tape out of a cassette disposed on a surface of the apparatus to engage the tape with the rotational cylinder and for guiding the tape back into the cassette, said tape take-out means including means for engaging the tape, guide surfaces defining a path of movement of the tape engaging means, and driving means for moving the tape engaging means along said path, wherein said tape take-out means further includes control means for moving said tape engaging means upwardly and/or downwardly relative to the surface on which the cassette is disposed and for inclining said tape engaging means backwardly and/or forwardly in the direction of movement of the tape engaging means along said path during a tape taking-out operation to reduce tape damage.

18. A tape loading apparatus for use in a magnetic recording and/or reproducing machine having a rotatable cylinder provided with a magnetic head mounted on a peripheral surface thereof, the apparatus comprising:

tape withdrawing means movable along a predetermined path to withdraw a magnetic tape out of a cassette and load the withdrawn tape onto said rotatable cylinder such that the tape runs on the peripheral surface of the cylinder with the longitudinal axis of the tape inclined relative to an axis of said cylinder, said tape withdrawing means including a base movable along said predetermined path and a tape guide fixed to and upstanding from an upper surface of said base so that said tape guide is movable with said base;

guiding means for defining said predetermined path;

means for driving said tape withdrawing means along said guiding means; and means for varying an angle between an axis of said tape guide and the vertical during movement of said base and said tape guide along said guiding means, said means for varying including at least two sliding means provided on a bottom of said base and spaced in a direction of movement of said base along said predetermined path, elongated upper slide bearing means on which one of said sliding means slide and elongated lower slide bearing means on which the other of said sliding means slides, said elongated upper and lower slide bearing means extending substantially along said predetermined path, said upper and lower slide bearing means being vertically offset from each other, the vertical offset between said upper and lower slide bearing means being varied along at least a part of respective lengths of said upper and lower slide bearing means such that said tape guide is inclined forwardly and rearwardly during movement thereof along said predetermined path.

19. A tape loading apparatus according to claim 18, wherein said upper slide bearing means comprises a pair of laterally spaced upper bearing surfaces extending along and disposed on opposite sides of said predetermined path and said lower slide bearing means comprises a pair of laterally spaced lower bearing surfaces respectively extending along said upper bearing surfaces, and wherein said one of said sliding means comprises a first sliding portion provided on said bottom of said base adjacent to one of the ends thereof and disposed substantially on an axis thereof parallel to said predetermined path and said other of said sliding means comprises laterally spaced second and third sliding portions provided on said bottom of said base adjacent to the other end thereof and disposed on the opposite sides of said axis of said base, and wherein said first sliding portion is slidably supported on said upper bearing surfaces while said second and third sliding portions are respectively slidably supported on said lower bearing surfaces.

20. A tape loading apparatus according to claim 19, wherein one of said lower bearing surfaces has a height varied with respect to a height of the other of said lower bearing surfaces and at least a part of a length of said predetermined path to cause said tape guide to be inclined laterally of said predetermined path during movement of said tape guide therealong.

* * * * *